US009102820B2

(12) United States Patent
Nakajima et al.

(10) Patent No.: US 9,102,820 B2
(45) Date of Patent: Aug. 11, 2015

(54) POLYPROPYLENE RESIN COMPOSITION AND MOLDED ARTICLE COMPRISING THE SAME

(75) Inventors: Hiroyoshi Nakajima, Ichihara (JP); Takashi Fujimoto, Shinagawa-ku (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 921 days.

(21) Appl. No.: 12/055,442

(22) Filed: Mar. 26, 2008

(65) Prior Publication Data
US 2008/0249225 A1    Oct. 9, 2008

(30) Foreign Application Priority Data

Apr. 3, 2007 (JP) ................. 2007-097517
Apr. 3, 2007 (JP) ................. 2007-097518

(51) Int. Cl.
| | |
|---|---|
| *C08K 3/34* | (2006.01) |
| *C08L 53/00* | (2006.01) |
| *C08L 23/08* | (2006.01) |
| *C08F 297/08* | (2006.01) |
| *C08L 23/12* | (2006.01) |
| *C08F 210/06* | (2006.01) |
| *C08F 210/16* | (2006.01) |
| *C08L 57/02* | (2006.01) |

(52) U.S. Cl.
CPC ........... *C08L 23/0815* (2013.01); *C08F 297/08* (2013.01); *C08F 297/083* (2013.01); *C08L 23/12* (2013.01); *C08L 53/00* (2013.01); *C08F 210/06* (2013.01); *C08F 210/16* (2013.01); *C08L 57/02* (2013.01)

(58) Field of Classification Search
CPC . C08L 23/10; C08L 2666/02; C08L 2666/06; C08L 23/0815; C08L 23/14; C08L 23/08; C08L 2205/22; C09J 123/10; C09J 123/04; C09J 123/02; C09J 2453/00; C09J 123/0815; C09J 123/12; C09J 125/02
USPC .................. 524/499, 451; 525/88
See application file for complete search history.

(56) References Cited

U.S. PATENT DOCUMENTS

| | | | | |
|---|---|---|---|---|
| 4,997,872 A | * | 3/1991 | Ohmae et al. ............ | 524/433 |
| 5,324,991 A | * | 6/1994 | Furuta et al. ............. | 706/41 |
| 5,536,773 A |   | 7/1996 | Yamada et al. | |
| 5,852,100 A | * | 12/1998 | Sadatoshi et al. ........ | 524/505 |
| 6,031,034 A | * | 2/2000 | Morimoto et al. ....... | 524/108 |
| 6,114,460 A | * | 9/2000 | Hirakawa et al. ........ | 525/290 |
| 6,306,972 B1 | * | 10/2001 | Ohkawa et al. ........... | 525/240 |
| 6,391,974 B1 | * | 5/2002 | Ogawa et al. ............. | 525/191 |
| 6,455,636 B2 | * | 9/2002 | Sanada ....................... | 525/132 |
| 6,476,138 B2 | * | 11/2002 | Sato et al. ................. | 525/191 |
| 6,759,465 B1 | * | 7/2004 | Shimojo et al. ........... | 524/451 |
| 6,767,953 B2 | * | 7/2004 | Ohkawa et al. ........... | 524/451 |
| 6,773,808 B2 | * | 8/2004 | Ogawa et al. ............. | 428/349 |
| 6,869,993 B2 | * | 3/2005 | Watanabe et al. ........ | 524/210 |
| 7,166,677 B2 | * | 1/2007 | Doi et al. .................. | 525/240 |
| 7,439,296 B2 | * | 10/2008 | Kanzaki .................... | 524/505 |
| 2002/0037965 A1 | * | 3/2002 | Kinoshita et al. ........ | 525/127 |
| 2002/0040100 A1 | * | 4/2002 | Kume et al. ............... | 525/89 |
| 2002/0182391 A1 | * | 12/2002 | Migliorini et al. ....... | 428/216 |
| 2003/0022999 A1 | * | 1/2003 | Kagami et al. ............ | 525/240 |
| 2003/0176555 A1 | * | 9/2003 | Watanabe et al. ........ | 524/451 |
| 2004/0229064 A1 | * | 11/2004 | DeMeuse .................. | 428/515 |
| 2005/0228141 A1 | * | 10/2005 | Moritomi et al. ......... | 525/247 |
| 2006/0058434 A1 | * | 3/2006 | Watanabe .................. | 524/210 |
| 2006/0089417 A1 | * | 4/2006 | Hisayama et al. ........ | 521/142 |
| 2006/0135672 A1 | * | 6/2006 | Kanzaki .................... | 524/451 |
| 2006/0199909 A1 | * | 9/2006 | Toyoda et al. ............. | 525/192 |
| 2007/0225446 A1 | * | 9/2007 | Nakano et al. ............ | 525/240 |
| 2007/0287804 A1 | * | 12/2007 | Tominaga .................. | 525/240 |
| 2008/0221256 A1 | * | 9/2008 | Kanzaki .................... | 524/505 |
| 2009/0326123 A1 |   | 12/2009 | Nakajima et al. | |

FOREIGN PATENT DOCUMENTS

| | | | |
|---|---|---|---|
| CN | 1102419 | A | 5/1995 |
| CN | 1789320 | A | 6/2006 |
| JP | S59-68340 | A | 4/1984 |
| JP | H0347297 | B2 | 7/1991 |
| JP | 05-230254 | A | 9/1993 |
| JP | 8-208943 | A | 8/1996 |
| JP | 09-143338 | A | 6/1997 |
| JP | 11-209532 | A | 8/1999 |
| JP | 2002-030196 | A | 1/2002 |
| JP | 2002-201322 | A | 7/2002 |
| JP | 2002-283382 | A | 10/2002 |
| JP | 2003-253084 | A | 9/2003 |

OTHER PUBLICATIONS

Petrie, Edward M. (1999) Handbook of Adhesives and Sealants, McGraw-Hill Professional, p. 324. Available Online at: http://books.google.com/books?id=4MTUnaKjuDAC.*

(Continued)

*Primary Examiner* — Ling Choi
*Assistant Examiner* — Chun-Cheng Wang
(74) *Attorney, Agent, or Firm* — Sughrue Mion, PLLC

(57) ABSTRACT

A polypropylene resin composition is disclosed which contains a propylene polymer (A) selected from the group consisting of propylene homopolymers (A-1) and propylene-ethylene block copolymers (A-2) which are propylene-ethylene block copolymers each of which is composed of a propylene homopolymer component and a propylene-ethylene random copolymer component and has an intrinsic viscosity of from 2 to 8 dl/g, an ethylene-α-olefin copolymer (B) defined below, the amount of the polymer (A) and the amount of the copolymer (B) each being based on the combined amount of the polymer (A) and the copolymer (B) which is an ethylene-α-olefin copolymer having a melt index, as measured at 190° C., of from 1 to 40 g/10 min, and a petroleum resin (C-1) or a terpene resin (C-2) having a glass transition temperature of 90° C. or lower.

4 Claims, 1 Drawing Sheet

(56) References Cited

OTHER PUBLICATIONS

Tackifying Resin (2002) The Free Library. Farlex. Available Online at: http://www.thefreelibrary.com/Tackifying+resin.+(Materials)-a095794741.*

Dow AFFINITY EG8200 Datasheet at MatWeb (1996) Available online at: http://www.matweb.com/search/datasheet.aspx?MatGUID=859bb34fd52d4827824e2ea82ef9032d&ckck=1.*

Escorez 5300 product data sheet to provide evidence of glasss transition temperature, Dec. 2006.*

Rejection Decision issued Oct. 18, 2011 in Chinese Patent Application No. 200810090390.0 with translation.

Second Office Action issued Aug. 1, 2012 in Chinese Patent Application No. 200810090390.0 with translation.

First Office Action issued Feb. 24, 2011 in Chinese Patent Application No. 200810090390.0 with translation.

Notification of Reason(s) for Rejection issued Mar. 27, 2012 in Japanese Patent Application No. 2008-095869 with translation.

* cited by examiner

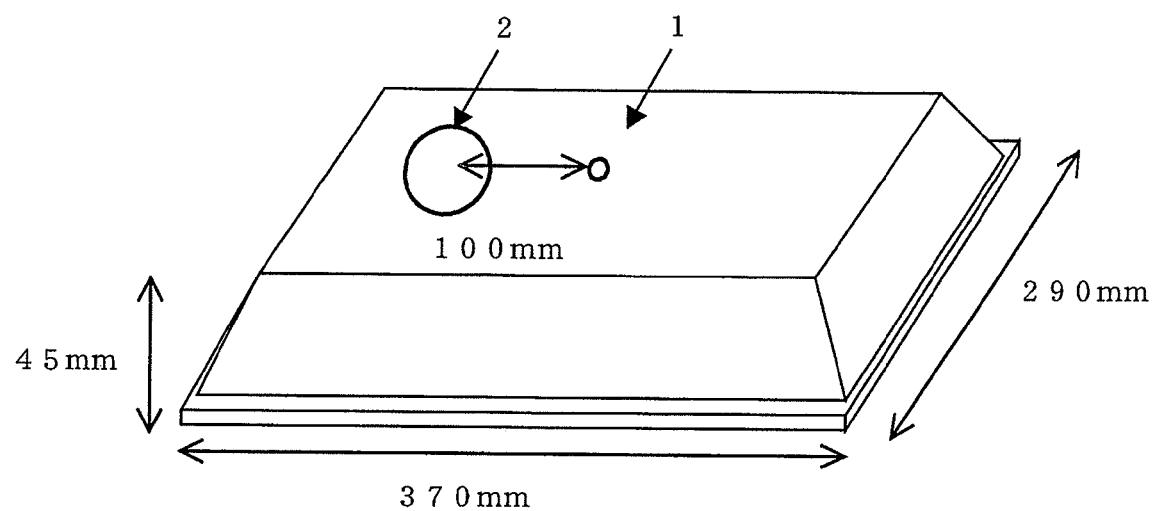

POLYPROPYLENE RESIN COMPOSITION AND MOLDED ARTICLE COMPRISING THE SAME

BACKGROUND OF THE INVENTION

1. Field of the Invention

The present invention relates to polypropylene resin compositions and molded articles made therefrom. In particular, the present invention relates to polypropylene resin compositions useful as materials for molded articles with less silver streaks and to molded articles made therefrom.

2. Description of the Related Art

Heretofore, polypropylene resins are used as materials for automobiles because of their high rigidity and excellent impact resistance and various types of polypropylene resin compositions have been proposed.

For example, JP-A 8-208943 discloses a resin composition comprising an ethylene-propylene block copolymer and an ethylene-α-olefin copolymer.

JP-A 9-143338 discloses a resin composition comprising an ethylene-propylene block copolymer, an ethylene-hexene copolymer, and an inorganic filler.

JP-A 11-209532 discloses a resin composition comprising an ethylene-propylene block copolymer, an ethylene-α-olefin copolymer, and an inorganic filler.

JP-A 2002-30196 discloses a resin composition comprising an ethylene-propylene block copolymer, an ethylene-α-olefin copolymer, and an inorganic filler.

JP-A 59-68340 discloses a resin composition comprising a polypropylene-based resin and a petroleum resin.

Moreover, in order to improve thermoformabilit, etc., resin compositions comprising a polypropylene-based resin and a terpene resin have been proposed (see, for example, JP-A 2002-201322 and JP-A 5-230254).

However, reduction in silver streaks in molded articles obtained from polypropylene resin compositions disclosed in the publications cited above has been demanded.

SUMMARY OF THE INVENTION

In one aspect, the present invention provides a polypropylene resin composition comprising:

from 40 to 99% by weight of a propylene polymer (A) selected from the group consisting of propylene homopolymers (A-1) and propylene-ethylene block copolymers (A-2) defined below, from 1 to 60% by weight of an ethylene-α-olefin copolymer (B) defined below, the amount of the polymer (A) and the amount of the copolymer (B) each being based on the combined amount of the polymer (A) and the copolymer (B), and from 0.1 to 20 parts by weight, based on 100 parts by weight in total of the polymer (A) and the copolymer (B), of a petroleum resin (C-1) or a terpene resin (C-2) having a glass transition temperature of 90° C. or lower, wherein the propylene-ethylene block copolymers (A-2) are propylene-ethylene block copolymers each of which is composed of a propylene homopolymer component and a propylene-ethylene random copolymer component and has an intrinsic viscosity of from 2 to 8 dl/g, and the ethylene-α-olefin copolymer (B) is an ethylene-α-olefin copolymer having a melt index, as measured at 190° C., of from 1 to 40 g/10 min, wherein the α-olefin has from 4 to 20 carbon atoms.

In one preferable embodiment, the polypropylene resin composition further comprises an inorganic filler (D) in an amount of from 0.1 to 60 parts based on 100 parts in total of the propylene polymer (A) and the ethylene-α-olefin copolymer (B).

In another preferable embodiment, the polypropylene resin composition has a melt index, as measured at a temperature of 230° C., of from 40 to 200 g/10 min.

In another preferable embodiment, the density of the ethylene-α-olefin copolymer (B) has a density of from 0.85 to 0.89 g/cm$^3$.

In another aspect, the present invention provides a molded article comprising the polypropylene resin compositions. In a preferable embodiment, the molded article is a foamed molded article, namely, a molded article composed of a foamed polypropylene resin composition.

According to the present invention, polypropylene resin compositions useful as materials for molded articles with less silver streaks are proposed and it is possible to obtain molded articles with less silver streaks by molding such compositions.

BRIEF DESCRIPTION OF THE DRAWING

The FIGURE is a perspective view of the foamed molded article of the polypropylene resin composition produced in Example 1. In this FIGURE, the reference numerals 1 and 2 donate a gate contacting part and a site where silver streaks were evaluated, respectively.

DESCRIPTION OF THE PREFERRED EMBODIMENTS

In the present invention, a propylene polymer (A) selected from the group consisting of propylene homopolymers (A-1) and specific propylene-ethylene block copolymers (A-2) is used from the viewpoints of the rigidity, heat resistance, and hardness of molded articles.

The propylene-ethylene block copolymers (A-2) are copoylmers each composed of a propylene homopolymer portion and a propylene-ethylene random copolymer component.

A propylene homopolymer (A-1) preferably has an isotactic pentad fraction, as measured by $^{13}$C-NMR, of not less than 0.95, and more preferably not less than 0.98.

The propylene homopolymer component of a propylene-ethylene block copolymer (A-2) preferably has an isotactic pentad fraction, as measured by $^{13}$C-NMR, of not less than 0.95, and more preferably not less than 0.98.

The isotactic pentad fraction is a fraction of propylene monomer units which are present at the center of an isotactic chain in the form of a pentad unit in the polypropylene molecular chain, in other words, a fraction of propylene monomer units present at the center of a chain in which five propylene monomer units are meso-bonded successively in the polypropylene molecular chain. The isotactic pentad fraction is measured by the method disclosed by A. Zambelli et al. in Macromolecules 6, 925 (1973), namely, a method using $^{13}$C-NMR. NMR absorption peaks are assigned according to the disclosure of Macromolecules, 8, 687 (1975).

Specifically, the isotactic pentad fraction is a ratio of the mmmm peak area to the total peak area in the methyl carbon ranges observed in a $^{13}$C-NMR spectrum. According to this method, the isotactic pentad fraction of an NPL standard substance, CRM No. M19-14 Polypropylene PP/MWD/2 available from NATIONAL PHYSICAL LABORATORY, G.B. was measured to be 0.944.

The intrinsic viscosity $[\eta]_P$ of the propylene homopolymer (A-1) as measured in tetralin at 135° C. and the intrinsic viscosity $[\eta]_p$ of the propylene homopolymer component of the block copolymer (A-2) as measured in tetralin 135° C. is preferably from 0.7 to 5 dl/g, and more preferably from 0.8 to 4 dl/g.

The molecular weight distribution, as measured by gel permeation chromatography (GPC) using polystyrene standards, of the propylene homopolymer (A-1) and the propylene homopolymer component of the block copolymer (A-2) are each preferably from 3 to 7.

The ethylene content of the propylene-ethylene random copolymer component of the block copolymer (A-2) is preferably from 20 to 65% by weight, and more preferably from 25 to 50% by weight.

The intrinsic viscosity $[\eta]_{EP}$, as measured in tetralin at 135° C., of the propylene-ethylene random copolymer component of the block copolymer (A-2) is preferably from 2 to 8 dl/g, and more preferably from 3 to 8 dl/g.

The content of the propylene-ethylene random copolymer component in the block copolymer (A-2) is preferably from 10 to 60% by weight, and more preferably from 10 to 40% by weight.

The melt index (MI), as measured at a temperature of 230° C. and a load of 2.16 kgf, of the propylene homopolymer (A-1) is preferably from 0.1 to 400 g/10 min, and more preferably from 1 to 300 g/10 min.

The melt index (MI), as measured at a temperature of 230° C. and a load of 2.16 kgf, of the propylene-ethylene block copolymer (A-2) is preferably from 0.1 to 200 g/10 min, and more preferably from 5 to 150 g/10 min.

The propylene polymer (A) can be produced, for example, by using a conventional polymerization catalyst and a conventional polymerization method.

Examples of such a polymerization catalyst to be used in the preparation of the propylene polymer (A) include catalyst systems composed of (1) a solid catalyst component containing magnesium, titanium, halogen and an electron donor as essential components, (2) an organoaluminum compound and (3) an electron donating component. Methods for preparing such catalysts are disclosed, for example, in JP-A 1-319508, JP-A 7-216017 and JP-A 10-212319.

Examples of the polymerization method to be used in the preparation of the propylene polymer (A) include bulk polymerization, solution polymerization, slurry polymerization and vapor phase polymerization. Such polymerization methods may be conducted either in a batch system or in a continuous system. Such polymerization methods may also be combined optionally.

The propylene-ethylene block copolymer (A-2) is preferably produced by a method which is conducted by the use of a polymerization apparatus including at least two polymerization vessels arranged in series and in which, in the presence of an aforesaid catalyst system composed of (1) a solid catalyst component, (2) an organoaluminium compound and (3) an electron donating component, a propylene homopolymer component of a propylene-ethylene block copolymer is produced in a polymerization vessel and then transferred to the next polymerization vessel, and subsequently a propylene-ethylene random copolymer component is produced continuously, yielding a propylene-ethylene block copolymer.

The amounts of (1) the solid catalyst component, (2) the organoaluminum compound and (3) the electron donating component used in the polymerization method and the method for feeding the catalyst components into polymerization reactors may be determined appropriately.

The polymerization temperature is typically from −30 to 300° C., and more preferably from 20 to 180° C. The polymerization pressure is typically from normal pressure to 10 MPa, and preferably from 0.2 to 5 MPa. As a molecular weight regulator, hydrogen, for example, may be used.

In the production of the propylene polymer (A), preliminary polymerization may be conducted prior to the main polymerization. The preliminary polymerization can be carried out by feeding a small amount of propylene in the presence of a solid catalyst component (1) and an organoaluminum compound (2) in a solvent.

The ethylene-α-olefin copolymer (B) to be used in the present invention may be an ethylene-α-olefin random copolymer or a mixture of ethylene-α-olefin random copolymers.

The density of the copolymer (B) is preferably from 0.85 to 0.89 g/cm$^3$, more preferably from 0.85 to 0.88 g/cm$^3$, and even more preferably from 0.86 to 0.88 g/cm$^3$.

The ethylene content of the copolymer (B) is preferably from 20 to 95% by weight, and more preferably from 30 to 90% by weight. The α-olefin content is preferably from 5 to 80% by weight, and more preferably from 10 to 70% by weight.

The MI, as measured at a temperature of 190° C. and a load of 2.16 kgf, of the copolymer (B) is from 1 to 40 g/10 min, and preferably from 10 to 40 g/10 min.

The α-olefin which is a constituent of the copolymer (B) is selected from α-olefins having from 4 to 20 carbon atoms and specific examples thereof include 1-butene, 1-pentene, 1-hexene, 4-methyl-1-pentene, 1-heptene, 1-octene, 1-decene, 1-dodecene, 1-tetradecene, 1-hexadecene, and 1-eicocene. Preferable α-olefins include α-olefins having from 4 to 12 carbon atoms, such as 1-butene, 1-hexene and 1-octene.

The copolymer (B) can produced by polymerizing given monomers by slurry polymerization, solution polymerization, bulk polymerization, vapor phase polymerization, etc. using a metallocene catalyst. Examples of such a metallocene catalyst include metallocene catalysts disclosed in JP-A 3-163088, JP-A 4-268307, JP-A 9-12790, JP-A 9-87313, JP-A 11-80233 and JP-A 10-508055. A preferable example of the method for producing the copolymer (B) using a metallocene catalyst is the method disclosed in EP-A 1211287.

The content of the propylene polymer (A) in the polypropylene resin composition of the present invention is from 40 to 99% by weight, preferably from 60 to 95% by weight, and more preferably from 70 to 95% by weight. The content of the ethylene-α-olefin copolymer (B) is from 1 to 60% by weight, preferably from 5 to 40% by weight, and more preferably from 5 to 30% by weight. It is noted that the amounts of the polymer (A) and the amount of the copolymer (B) are each based on the combined amount of the polymer (A) and the copolymer (B).

The petroleum resin (C-1) is a thermoplastic resin obtained by polymerizing decomposed oil fractions produced by pyrolysis of petroleum, followed by solidification of the resulting polymer. Examples thereof include aliphatic petroleum resins produced from C5 fractions, aromatic petroleum resins produced from C9 fractions, alicyclic petroleum resins produced from dicyclopentadiene, and copolymerized petroleum resins produced by copolymerization of two or more of the aforementioned petroleum resins, and hydrogenated petroleum resins prepared by hydrogenation of the aforementioned petroleum resins.

The petroleum resin (C-1) preferably has a glass transition temperature (Tg), as measured by differential scanning calorimetry (DSC), of not higher than 100° C., more preferably from 50 to 100° C., and even more preferably from 60 to 75° C.

Commercially available products can be used as the petroleum resin (C-1). Specific examples include Hirez and Petrozin produced by Mitsui Chemicals, Inc., Arkon produced by Arakawa Chemical Industries, Ltd., and Escorez produced by TONEX Co., Ltd. are mentioned.

Representative examples of the terpene resin (C-2) include terpene homopolymer resins produced by polymerizing only a terpene monomer in the presence of a Friedel-Crafts type catalyst, aromatic modified terpene resins produced by copolymerizing a terpene monomer with an aromatic monomer, and phenol-modified terpene resins produced by copolymerizing a terpene monomer with a phenol. Hydrogenated terpene resins, which are obtained by hydrogenating such terpene resins, can also be used as the terpene resin (C-2). From the viewpoint of the effect of reducing silver streaks, the terpene resin (C-2) is required to have a glass transition temperature (Tg), as measured by differential scanning calorimetry (DSC), of not higher than 90° C., and it is preferably not higher than 70° C.

Examples of the terpene monomer include monocyclic monoterpenes such as α-pinene, β-pinene, dipentene, d-limonene, myrcene, alloocimene, ocimene, α-phellandrene, α-terpinene, γ-terpinene, terpinolene, 1,8-cineole, 1,4-cineole, α-terpineol, β-terpineol, γ-terpineol, sabinene, paramentadiene, and carenes. Among such compounds, α-pinene, β-pinene, dipentene and d-limonene are used particularly preferably. Examples of the aromatic monomer include styrene, α-methylstyrene, vinyltoluene and isopropenyltoluene. Examples of the phenol include phenol, cresol and bisphenol A.

Examples of terpene resins which can be used as the terpene resin (C-2) include a terpene homopolymer resin commercially available under the name of YS Resin PX from Yasuhara Chemical, Inc., aromatic modified terpene resins commercially available under the names of YS Resin TO and YS Resin TR, hydrogenated terpene resins commercially available under the name of Clearon, a terpene phenolic resin commercially available under the name of YS Polyster, and a terpene phonolic resin commercially available under the name of Mightyace.

The added amount of the petroleum resin (C-1) or the terpene resin (C-2), based on 100 parts by weight of the propylene polymer (A) and the ethylene-α-olefin copolymer (B), is from 0.1 to 20 parts by weight, preferably from 0.1 to 10 parts by weight, more preferably from 5 to 10 parts by weight, and even more preferably from 5 to 8 parts by weight.

Examples of the inorganic filler (D) include carbon fiber, metal fiber, glass beads, mica, calcium carbonate, potassium titanate whisker, talc, bentonite, smectite, mica, sepiolite, wollastonite, allophane, imogolite, fibrous magnesium oxysulfate, barium sulfate, and glass flakes. Talc is preferred.

The average particle diameter of the inorganic filler (D) is usually from 0.01 to 50 μm, preferably from 0.1 to 30 μm, and more preferably from 0.1 to 5 μm. The average particle diameter of the inorganic filler (D) means a 50% equivalent particle diameter D50 which is determined from an integral distribution curve by the sub-sieve method which is produced by measuring a suspension of the inorganic filler (D) in a dispersing medium, such as water and alcohol, by means of a centrifugal sedimentation type particle size distribution analyzer.

In the preparation of the resin composition, the inorganic filler (D) may be used without being subjected to any treatment or alternatively may be used after treatment of its surface with a conventional agent, such as a silane coupling agent, a titanium coupling agent, a higher fatty acid, a higher fatty ester, a higher fatty amide, a salt of a higher fatty acid, or other surfactant, in order to improve the interfacial adhesion with resins or improve the dispersibility of the inorganic filler in the polypropylene resin composition. The added amount of the inorganic filler (D), based on 100 parts by weight of the propylene polymer (A) and the ethylene-α-olefin copolymer (B), is from 0.1 to 60 parts by weight, preferably from 0.1 to 30 parts by weight, and more preferably from 1 to 10 parts by weight.

The melt flow rate (MI), as measured at a temperature of 230° C. and a load of 2.16 kgf, of the polypropylene resin composition of the present invention is preferably from 40 to 200 g/10 min, more preferably form 40 to 150 g/10 min, and even more preferably from 40 to 120 g/10 min.

The polypropylene resin composition of the present invention can be produced by kneading the components. In the kneading, a kneading device such as a single screw extruder, a twin screw extruder, a Banbury mixer, and a set of hot rolls can be used. The kneading temperature is typically from 170 to 250° C., and the kneading time is typically from 1 to 20 minutes. Kneading of the components may be performed either simultaneously and separately.

The polypropylene resin composition of the present invention is allowed to contain additives, examples of which include neutralizing agents, antioxidants, light-resisting agents, UV absorbers, copper inhibitors, lubricants, processing aids, plasticizers, dispersing agents, antiblocking agents, antistatic agents, nucleating agents, flame retardants, foaming agents, foam inhibitors, crosslinking agents, and colorants such as pigments.

The polypropylene resin composition of the present invention can be shaped by an appropriate method into a shaped article, which is also referred to as a molded article. Examples of the shaping method which can be used include injection molding, extrusion forming, rotation molding, vacuum molding, foaming molding and blow molding.

In a preferable embodiment of the present invention, a foamed article can be obtained by molding a foaming composition prepared by incorporating a foaming agent into the polypropylene resin composition of the present invention. The foaming agent for use in the present invention may be selected from conventional foaming agents including chemical foaming agents and physical foaming agents. For the foaming molding of the polypropylene resin composition of the present invention, various methods known as methods for foaming molding of thermoplastic resins can be used, such as injection foaming, press foaming, extrusion foaming, and stamping foaming.

In one embodiment of the present invention, a decorated molded article having a surface covered with a skin material can be obtained by using a lamination molding technique, such as insert molding, in the molding of the polypropylene resin composition of the present invention. A decorated molded article can be obtained also by adhering a skin material to a surface of a beforehand-prepared molded article composed of the polypropylene resin composition of the present invention produced beforehand. Also in the production of a decorated molded article, the polypropylene resin composition of the present invention in which a foaming agent has been incorporated can be used. In such an event, a decorated foamed molded article is obtained.

In the present invention, various types of conventional skin materials can be used. Examples of skin materials which can be used include woven fabric, non-woven fabric and knitted fabric made of natural fiber or synthetic fiber, and a film and a sheet made of a thermoplastic resin or a thermoplastic elastomer. Such skin materials may be either of a monolayer structure or of a multilayer structure.

The skin material may, for example, be a multilayer skin material composed of a decorative layer and a backing layer.

In one preferable embodiment, the backing layer is a cushion layer having a cushioning property. Examples of the material which constitutes such a cushion layer include polyurethane foam, EVA foam, polypropylene foam and polyethylene foam.

Applications of molded articles produced from the polypropylene resin composition of the present invention include interior or exterior components of automobiles, components of motorcycles, components of furniture or electric appliances.

Examples of the automotive interior components include instrument panels, trims, door panels, side protectors, console boxes, and column covers. Examples of the automotive exterior components include bumpers, fenders, and wheel covers. Examples of the motorcycle components include cowlings, and muffler covers.

EXAMPLES

The present invention is described below with reference to Examples and Comparative Examples.

In the Examples or Comparative Examples, the resins and additives shown below were used.

Propylene-(propylene-ethylene) Copolymer (A-1)

This was prepared by gas phase polymerization using a solid catalyst component disclosed in JP-A2004-182981, Example 4.

MI: 32 g/10 min

Intrinsic viscosity of the propylene-(propylene-ethylene) copolymer $[\eta]_T$: 1.6 dl/g Intrinsic viscosity of the propylene homopolymer portion $[\eta]_P$: 0.93 dl/g Weight ratio of the propylene-ethylene random copolymer portion to the entire portion of the copolymer: 20% by weight Intrinsic viscosity of the propylene-ethylene random copolymer portion $[\eta]_{EP}$: 4.5 dl/g Ethylene unit content of the propylene-ethylene random copolymer portion: 36% by weight Propylene Homopolymer (A-2)

Commercial name: U501E1 (produced by Sumitomo Chemical Co., Ltd.)

MI: 120 g/10 min

Propylene Homopolymer (A-3)

This was prepared by gas phase polymerization using a solid catalyst component disclosed in JP-A 10-212319, Example 7.

MI: 300 g/10 min

Propylene-(propylene-ethylene) Copolymer (A-4)

This was prepared by gas phase polymerization using a solid catalyst component prepared by the procedure shown below.

MI: 80 g/10 min

Intrinsic viscosity of the propylene-(propylene-ethylene) copolymer $[\eta]_T$: 1.4 dl/g Intrinsic viscosity of the propylene homopolymer portion $[\eta]_P$: 0.80 dl/g Weight ratio of the propylene-ethylene random copolymer portion to the entire portion of the copolymer: 12% by weight Intrinsic viscosity of the propylene-ethylene random copolymer portion $[\eta]_{EP}$: 7 dl/g Ethylene unit content of the propylene-ethylene random copolymer portion: 32% by weight The solid catalyst component used for the production of the copolymer (A-4) was prepared by the following method.

(1) Solid Component (a)

Into a nitrogen-purged reactor equipped with a stirrer, 800 liters of hexane, 6.8 kg of diisobutyl phthalate, 350 kg of tetraethoxysilane and 38.8 kg of tetrabutoxytitanium were fed and stirred. Then, to the stirred mixture, 900 liters of a solution of butylmagnesium chloride in dibutyl ether (concentration: 2.1 mol/l) was dropped over 5 hours while the temperature in the reactor was kept at 7° C. After the dropping was completed, the mixture was further stirred for one hour at 20° C., followed by filtration. Then, the resulting solid was washed with 1100 liters of toluene three times. The washed solid was added to toluene and dispersed therein, yielding 625 liters of a slurry. The resulting slurry was heated at 70° C. for 1 hour with stirring and then was cooled to room temperature.

A part of the slurry was filtered and the resulting solid component was dried under reduced pressure. The solid component obtained was subjected to composition analysis, which revealed that the solid component contained 2.1% by weight of titanium atoms, 38.9% by weight of ethoxy groups and 3.4% by weight of butoxy groups. The valence of the titanium atoms in the solid component was trivalent.

(2) Preparation of Solid Catalyst Component (Activation 1)

The atmosphere in a 100-ml flask equipped with a stirrer, a dropping funnel and a thermometer was replaced by nitrogen. Then, a slurry containing 8 g of the dried solid component obtained in (1) described above was charged into the flask and was left at rest to separate into a supernatant liquid and a concentrated slurry. A part of the supernatant liquid was removed so that the resultant would have a volume of 26.5 ml. Then, a mixture of 16.0 ml of titanium tetrachlorides and 0.8 ml of dibutyl ether was charged into the flask at 40° C., and subsequently a mixture of 2.0 ml of phthaloyl dichloride and 2.0 ml of toluene was dropped over 5 minutes. After the completion of the dropping, the reaction mixture was stirred at 115° C. for 4 hours. Then, the mixture was subjected to solid-liquid separation at that temperature, and the resulting solid was washed with 40 ml of toluene at 115° C. three times.

(Activation 2)

After the washing, toluene was added to the resulting solid to yield 26.5 ml of a slurry. To this slurry, a mixture of 0.8 ml of dibutyl ether, 0.45 ml of diisobutyl phthalate and 6.4 ml of titanium tetrachloride was charged, followed by stirring at 105° C. for 1 hour. Then, the mixture was subjected to solid-liquid separation at that temperature, and the resulting solid was washed with 40 ml of toluene at 105° C. twice.

(Activation 3)

Toluene was then added to the resulting solid to yield 26.5 ml of a slurry, followed by heating up to 105° C. To this slurry, a mixture of 0.8 ml of dibutyl ether and 6.4 ml of titanium tetrachloride was charged, followed by stirring at 105° C. for 1 hour. Then, the mixture was subjected to solid-liquid separation at that temperature, and the resulting solid was washed with 40 ml of toluene at 105° C. twice.

(Activation 4)

Toluene was then added to the resulting solid to yield 26.5 ml of a slurry, followed by heating up to 105° C. To this slurry, a mixture of 0.8 ml of dibutyl ether and 6.4 ml of titanium tetrachloride was charged, followed by stirring at 105° C. for 1 hour. Then, the mixture was subjected to solid-liquid separation at that temperature, and the resulting solid was washed with 40 ml of toluene at 105° C. six times and 40 ml of hexane at room temperature three times. The resulting solid was dried under reduced pressure, yielding a solid catalyst component. The solid catalyst component contained 1.6% by weight of titanium atoms, 7.6% by weight of diethyl phthalate, 0.8% by weight of ethyl n-butyl phthalate, and 2.5% by weight of diisobutyl phthalate.

Propylene-(propylene-ethylene) Copolymer (A-5)

This was prepared by gas phase polymerization using a solid catalyst component the same as that used in the preparation of the copolymer (A-4).

MI: 30 g/10 min

Intrinsic viscosity of the propylene-(propylene-ethylene) copolymer $[\eta]_T$: 1.6 dl/g Intrinsic viscosity of the propylene homopolymer portion $[\eta]_P$: 1.00 dl/g Weight ratio of the propylene-ethylene random copolymer portion to the entire portion of the copolymer: 16% by weight Intrinsic viscosity of the propylene-ethylene random copolymer portion $[\eta]_{EP}$: 5 dl/g Ethylene unit content of the propylene-ethylene random copolymer portion: 34.5% by weight Ethylene-butene Copolymer Rubber (B-1)

Commercial name: CX5505 (produced by Sumitomo Chemical Co., Ltd.)

Density: 0.878 g/cm$^3$

MI (measures at 190° C., 2.16 kg load): 14 g/10 min

Ethylene-propylene Copolymer Rubber (B-2)

Commercial name: V0115 (produced by Sumitomo Chemical Co., Ltd.)

Density: 0.870 g/cm$^3$

MI (measures at 190° C., 2.16 kg load): 4 g/10 min

Ethylene-butene Copolymer Rubber (B-3)

Commercial name: A35070 (produced by Sumitomo Chemical Co., Ltd.)

Density: 0.863 g/cm$^3$

MI (measures at 190° C., 2.16 kg load): 35 g/10 min

Petroleum Resin (C-1)

Commercial name: ARKON P-125 (produced by Arakawa Chemical Industries, Ltd.)

Glass transition temperature=69.6° C.

Petroleum Resin (C-2)

Commercial name: ARKON P-140 (produced by Arakawa Chemical Industries, Ltd.)

Glass transition temperature=78.6° C.

Hydrogenated Terpene Resin (C-3)

Commercial name: Clearon P-105 (produced by Yasuhara Chemical Co., Ltd.)

Glass transition temperature=40.3° C.

Hydrogenated Terpene Resin (C-4)

Commercial name: Clearon P-125 (produced by Yasuhara Chemical Co., Ltd.)

Glass transition temperature=70.2° C.

Hydrogenated Terpene Resin (C-5)

Commercial name: Clearon P-150 (produced by Yasuhara Chemical Co., Ltd.)

Glass transition temperature=98.0° C.

Terpene Resin (C-6)

Commercial name: YS Resin PX1250 (produced by Yasuhara Chemical Co., Ltd.)

Glass transition temperature=77.5° C.

Talc (D)

Commercial name: MWHST (Average particle diameter: 2 μm, produced by Hayashi Kasei Co., Ltd.)

Examples 1, 2, and Comparative Examples 1, 2

Predetermined amounts of the components shown in Table 1 were weighed out and preliminarily mixed in a tumbler uniformly. Then, the mixture was melt-extruded using a twin screw kneading extruder (TEX44SS 30BW-2V, manufactured by The Japan Steel Works, Ltd.) at an extrusion rate of from 30 to 50 kg/hr, a screw speed of 300 rpm, under vent suction to produce pellets of a propylene polymer composition.

Using the pellets, injection foam molding was conducted by the use of an injection molding machine ES2550/400HL-MuCell (clamping force=400 tons) manufactured by ENGEL.

A mold was used which had a box-shaped cavity having outline dimensions corresponding to a molded article as shown in FIG. 1, namely, 290 mm×370 mm and a height of 45 mm. The cavity in a mold-closed state had a fundamental cavity clearance (initial clearance) of 1.5 mm and locally had a section having a height of 1.6 mm. The mold had a gate the structure of which is a direct gate.

The cylinder temperature and the mold temperature were preset to 250° C. and 50° C., respectively. After closing the mold, injection of the composition containing a foaming agent was started. After completely filling up the mold cavity with the composition by injection thereof, a cavity surface of the mold was retracted by 2.0 mm to enlarge the cavity, thereby foaming the composition. The foamed composition was cooled to completely solidify, yielding a foamed article. The foamed article was evaluated at its site 100 mm away from the gate. The results are shown in Table 1.

The methods for measuring physical properties of the resin components and the compositions used in the Examples and the Comparative Examples are described below.

(1) Melt Index (MI, Unit: g/10 min)

Melt index was measured according to the method provided in JIS K6758.

Measurement was conducted at a temperature of 230° C. and a load of 2.16 kgf.

(2) Structural Analysis of Propylene-ethylene Block Copolymer (2-1) Intrinsic Viscosity of Propylene-ethylene Block Copolymer (2-1-a) Intrinsic Viscosity of Propylene Homopolymer Portion: $[\eta]_P$ The intrinsic viscosity $[\eta]_P$ of a propylene homopolymer portion of a propylene-ethylene block copolymer was measured by taking out a propylene homopolymer from the polymerization reactor after the production of the propylene homopolymer during the production of the block copolymer, and then measuring the $[\eta]_P$ of the propylene homopolymer taken out.

(2-1-b) Intrinsic Viscosity of Propylene-ethylene Random Copolymer Portion: $[\eta]_{EP}$ The intrinsic viscosity $[\eta]_P$ of the propylene homopolymer portion of a propylene-ethylene block copolymer and the intrinsic viscosity $[\eta]_T$ of the entire portion of the propylene-ethylene block copolymer were measured respectively, and then the intrinsic viscosity $[\eta]_{EP}$ of the propylene-ethylene random copolymer portion of the propylene-ethylene block copolymer was calculated from the following formula using the weight ratio X of the propylene-ethylene random copolymer portion to the entire portion of the propylene-ethylene block copolymer.

$$[\eta]_{EP}=[\eta]_T/X-(1/X-1)[\eta]_P$$

$[\eta]_P$: Intrinsic viscosity (dl/g) of the propylene homopolymer portion $[\eta]_T$: Intrinsic viscosity (dl/g) of the entire portion of the propylene-ethylene block copolymer (2-1-c) Weight Ratio X of Propylene-ethylene Random Copolymer Portion to the Entire Portion of Propylene-ethylene Block Copolymer The weight ratio X to the propylene-ethylene random copolymer portion to the entire portion of a propylene-ethylene-block copolymer was determined by measuring the heat of crystal fusion of the propylene homopolymer portion and that of the entire portion of the propylene-ethylene block copolymer, respectively, followed by calculation using the following formula. The heat of crystal fusion was measured by differential scanning calorimetry (DSC)

$$X=1-(\Delta Hf)_T/(\Delta Hf)_P$$

$(\Delta Hf)_T$: Heat of fusion of the block copolymer (cal/g)
$(\Delta Hf)_P$: Heat of fusion of the propylene homopolymer (cal/g)

(3) Ethylene Content $(C2')_{EP}$ of Propylene-ethylene Random Copolymer Portion in Propylene-ethylene Block Copolymer The ethylene content of the propylene-ethylene random copolymer portion of a propylene-ethylene block copolymer was determined by measuring the ethylene content of the entire portion of the propylene-ethylene block copolymer by the infrared absorption spectrum method, followed by a calculation using the following formula.

$$[(C2')_{EP}]=(C2')_T/X$$

$(C2')_T$: Ethylene content of the entire portion of the propylene-ethylene random copolymer (% by weight)
$(C2')_{EP}$: Ethylene content of the propylene-ethylene random copolymer portion (% by weight)
X: Weight ratio of the propylene-ethylene random copolymer portion to the entire portion of the propylene-ethylene block copolymer (4) Glass Transition Temperature (Tg, Unit: ° C.)

Measurement was conducted using a differential scanning calorimeter (DSC, Diamond DSC manufactured by PerkinElmer). A sample was heated from room temperature to 200° C. at a rate of 10° C./min and then held at 200° C. for 10 minutes. Next, the temperature was lowered to 30° C. at a rate of 10° C./min and then held at 30° C. for 10 minutes. The temperature was further increased to 200° C. at a rate of 10° C./min and in this course a DSC curve was produced in which the absorbed heat was the ordinate and the temperature was the abscissa. From a part of the DSC curve where it changes stepwise, an extrapolated onset temperature of glass transition and an extrapolated end temperature of glass transition were determined, and then a glass transition temperature was calculated therefrom.

(5) Appearance Evaluation of Foamed Article (Silver Streaks)

A region surrounded by a circle of 60 mm in diameter shown in FIG. 1 of a polypropylene resin composition foamed article produced by foaming molding, the region being 100 mm away from the gate portion of the molded article, was visually evaluated and judgment was made according to the following criteria.

1: No silver streaks in the surface of the foamed article are recognized visually.
2: Silver streaks are slightly noticeable.
3: Silver streaks are clearly noticeable.

TABLE 1

| | Components of composition | | | | | | | | MI | Appearance |
|---|---|---|---|---|---|---|---|---|---|---|
| | wt % | wt % | wt % | wt % | wt % | wt % | phc | phc | g/10 min | |
| Example 1 | A-1 35.5 | | | A-2 18.0 | A-3 23.5 | B-1 23.0 | C-1 5.0 | D 3.0 | 73 | 1 |
| Example 2 | A-1 35.5 | | | A2 18.0 | A-3 23.5 | B-1 23.0 | C-2 5.0 | D 3.0 | 71 | 2 |
| Example 3 | A-1 35.5 | | | A-2 18.0 | A-3 23.5 | B-1 23.0 | C-3 5.0 | D 3.0 | 69 | 1 |
| Example 4 | A-1 35.5 | | | A-2 18.0 | A-3 23.5 | B-1 23.0 | C-4 5.0 | D 3.0 | 73 | 1 |
| Example 5 | A-1 35.5 | | | A-2 18.0 | A-3 23.5 | B-1 23.0 | C-6 5.0 | D 3.0 | 69 | 1 |
| Example 6 | | A-4 60 | | A-2 17.0 | | B-1 23.0 | C-4 5.0 | | 72 | 2 |
| Example 7 | | | A-5 45.0 | | A-3 32.0 | B-1 23.0 | C-4 10.0 | | 69 | 2 |
| Example 8 | | | A-5 45.0 | A-2 15.0 | A-3 17.0 | B-3 23.0 | C-4 5.0 | | 57 | 2 |
| Example 9 | | | A-5 45.0 | | A-3 32.0 | B-1 23.0 | C-4 3.0 | | 55 | 2 |
| Example 10 | | | A-5 55.0 | | A-3 32.0 | B-1 13.0 | C-4 5.0 | | 61 | 2 |
| Comparative Example 1 | A-1 35.5 | | | A-2 18.0 | A-3 23.5 | B-1 23.0 | | D 3.0 | 56 | 3 |
| Comparative Example 2 | A-1 35.5 | | | A-2 18.0 | A-3 23.5 | B-2 23.0 | C-1 5.0 | D 3.0 | 59 | 3 |
| Comparative Example 3 | A-1 35.5 | | | A-2 18.0 | A-3 23.5 | B-1 23.0 | C-5 5.0 | D 3.0 | 62 | 3 |

In Examples 1 to 10, molded products having few silver streaks were obtained. Conversely, in Comparative Example 1, in which no petroleum resin was used, Comparative Example 2, in which the ethylene-propylene copolymer rubber (B-2) was used, and Comparative Example 3, in which a terpene resin having an excessively high glass transition temperature was used, molded articles in which silver streaks were clearly noticeable were obtained.

The invention claimed is:
1. A polypropylene resin composition comprising:
from 40 to 99% by weight of a propylene polymer (A) selected from the group consisting of propylene homopolymers (A-1) and propylene-ethylene block copolymers (A-2) defined below,
from 1 to 60% by weight of an ethylene-α-olefin copolymer (B) defined below, the amount of the polymer (A)

and the amount of the copolymer (B) each being based on the combined amount of the polymer (A) and the copolymer (B), from 0.1 to 20 parts by weight, based on 100 parts by weight in total of the polymer (A) and the copolymer (B), of a petroleum resin (C-1) having a glass transition temperature of 50 to 100° C., and from 0.1 to 60 parts by weight, based on 100 parts by weight in total of the polymer (A) and the copolymer (B), of an inorganic filler (D), wherein the propylene-ethylene block copolymers (A-2) are propylene-ethylene block copolymers each of which is composed of a propylene homopolymer component and a propylene-ethylene random copolymer component and has an intrinsic viscosity of from 2 to 8 dl/g, and the ethylene-α-olefin copolymer (B) is an ethylene-α-olefin copolymer having a melt index, as measured at 190° C., of from 1 to 40 g/10 min, wherein the α-olefin has from 4 to 20 carbon atoms.

2. The polypropylene resin composition according to claim 1, wherein the polypropylene resin composition has a melt index, as measured at 230° C., of from 40 to 200 g/10 min.

3. The polypropylene resin composition according to claim 1, wherein the ethylene-α-olefin copolymer (B) has a density of from 0.85 to 0.89 g/cm$^3$.

4. A molded article comprising the polypropylene resin composition according to claim 1.

* * * * *